(12) United States Patent
Wong et al.

(10) Patent No.: US 6,816,641 B2
(45) Date of Patent: Nov. 9, 2004

(54) METHOD AND STRUCTURE FOR A SOLID SLUG CATERPILLAR PIEZOELECTRIC OPTICAL RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 15 days.

(21) Appl. No.: 10/413,196

(22) Filed: Apr. 14, 2003

(65) Prior Publication Data

US 2004/0202413 A1 Oct. 14, 2004

(51) Int. Cl.[7] .............................. G02B 6/42; G02B 6/26
(52) U.S. Cl. ........................... 385/19; 385/16; 385/125
(58) Field of Search .............................. 385/14, 16–24, 385/125

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower et al. |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |

(List continued on next page.)

FOREIGN PATENT DOCUMENTS

| | | |
|---|---|---|
| EP | 0593836 A1 | 10/1992 |
| FR | 2418539 A | 9/1979 |
| FR | 2458138 A1 | 10/1980 |
| FR | 2667396 | 9/1990 |
| JP | 63-276838 | 5/1987 |
| JP | 01-294317 | 5/1988 |
| JP | 08-125487 A | 5/1996 |
| JP | 9161640 | 6/1997 |
| SH | 36-18575 | 10/1961 |
| SH | 47-21645 | 10/1972 |
| WO | WO 99/46624 A1 | 9/1999 |

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

(List continued on next page.)

*Primary Examiner*—Brian Healy
*Assistant Examiner*—Kevin S. Wood

(57) ABSTRACT

A method and structure for an optical switch. According to the structure and method of the present invention, a gas-filled chamber is housed within a solid material. A plurality of contacts within the gas-filled chamber are coupled to the solid material, while a plurality of piezoelectric elements within the gas-filled chamber are also coupled to the solid material. A slug within the gas-filled chamber is coupled to one or more of the plurality of contacts and further coupled to one or more of the plurality of piezoelectric elements. A liquid metal within the gas-filled chamber is coupled to the slug, and coupled to the plurality of contacts. The actuation of the one or more piezoelectric elements causes the slug to move from a first number of contacts to a second number of contacts wetted by the liquid metal.

35 Claims, 7 Drawing Sheets

U.S. PATENT DOCUMENTS

| | | | |
|---|---|---|---|
| 4,582,391 A | 4/1986 | Legrand | |
| 4,628,161 A | 12/1986 | Thackrey | |
| 4,652,710 A | 3/1987 | Karnowsky et al. | |
| 4,657,339 A | 4/1987 | Fick | |
| 4,742,263 A | 5/1988 | Harnden, Jr. et al. | |
| 4,786,130 A | 11/1988 | Georgiou et al. | |
| 4,797,519 A | 1/1989 | Elenbaas | |
| 4,804,932 A | 2/1989 | Akanuma et al. | |
| 4,988,157 A | 1/1991 | Jackel et al. | |
| 5,278,012 A | 1/1994 | Yamanaka et al. | |
| 5,415,026 A | 5/1995 | Ford | |
| 5,502,781 A | 3/1996 | Li et al. | |
| 5,644,676 A | 7/1997 | Blomberg et al. | |
| 5,675,310 A | 10/1997 | Wojnarowski et al. | |
| 5,677,823 A | 10/1997 | Smith | |
| 5,751,074 A | 5/1998 | Prior et al. | |
| 5,751,552 A | 5/1998 | Scanlan et al. | |
| 5,828,799 A | 10/1998 | Donald | |
| 5,841,686 A | 11/1998 | Chu et al. | |
| 5,849,623 A | 12/1998 | Wojnarowski et al. | |
| 5,874,770 A | 2/1999 | Saia et al. | |
| 5,875,531 A | 3/1999 | Nellissen et al. | |
| 5,886,407 A | 3/1999 | Polese et al. | |
| 5,889,325 A | 3/1999 | Uchida et al. | |
| 5,912,606 A | 6/1999 | Nathanson et al. | |
| 5,915,050 A | 6/1999 | Russell et al. | |
| 5,972,737 A | 10/1999 | Polese et al. | |
| 5,994,750 A | 11/1999 | Yagi | |
| 6,021,048 A | 2/2000 | Smith | |
| 6,180,873 B1 | 1/2001 | Bitko | |
| 6,201,682 B1 | 3/2001 | Mooij et al. | |
| 6,207,234 B1 | 3/2001 | Jiang | |
| 6,212,308 B1 | 4/2001 | Donald | |
| 6,225,133 B1 | 5/2001 | Yamamichi et al. | |
| 6,278,541 B1 | 8/2001 | Baker | |
| 6,304,450 B1 | 10/2001 | Dibene, II et al. | |
| 6,320,994 B1 | 11/2001 | Donald et al. | |
| 6,323,447 B1 | 11/2001 | Kondoh et al. | |
| 6,351,579 B1 | 2/2002 | Early et al. | |
| 6,356,679 B1 | 3/2002 | Kapany | |
| 6,373,356 B1 | 4/2002 | Gutierrez et al. | |
| 6,396,012 B1 | 5/2002 | Bloomfield | |
| 6,396,371 B2 | 5/2002 | Streeter et al. | |
| 6,408,112 B1 | 6/2002 | Bartels | |
| 6,446,317 B1 | 9/2002 | Figueroa et al. | |
| 6,453,086 B1 | 9/2002 | Tarazona | |
| 6,470,106 B2 | 10/2002 | McClelland et al. | |
| 6,487,333 B2 | 11/2002 | Fouquet et al. | |
| 6,501,354 B1 | 12/2002 | Gutierrez et al. | |
| 6,512,322 B1 | 1/2003 | Fong et al. | |
| 6,515,404 B1 | 2/2003 | Wong | |
| 6,516,504 B2 | 2/2003 | Schaper | |
| 6,559,420 B1 | 5/2003 | Zarev | |
| 6,633,213 B1 | 10/2003 | Dove | |
| 2002/0037128 A1 | 3/2002 | Burger et al. | |
| 2002/0146197 A1 | 10/2002 | Yong | |
| 2002/0150323 A1 | 10/2002 | Nishida et al. | |
| 2002/0168133 A1 | 11/2002 | Saito | |
| 2003/0035611 A1 | 2/2003 | Shi | |
| 2003/0080650 A1 * | 5/2003 | Wong et al. | 310/328 |

OTHER PUBLICATIONS

"Integral Power Resistors for Aluminum Substrate," IBM Technical Disclosure Bulletin, Jun. 1984, US, Jun. 1, 1984, p. 827, vol. 27, No. 1B, TDB–ACC–NO:NB8406827, Cross Reference: 0018–8689–27–1B–827.

Kim, Joonwon et al. "A Micromechanical Switch with Electrostatically Driven Liquid–Metal Droplet." Sensors and Actuators, A: Physical. v 9798, Apr. 1, 2002, 4 pages.

Jonathan Simon, "A Liquid–Filled Microrelay With A Moving Mercury Microdrop" (Sep. 1997), Journal of Microelectromechinical Systems, vol. 6, No. 3. pp 208–216.

Marvin Glenn Wong, "A Piezoelectrically Actuated Liquid Metal Switch", May 2, 2002, patent application (pending, 12 pages of specification, 5 pages of claims, 1 page of abstract, and 10 sheets of drawings (Figs. 1–10).

* cited by examiner

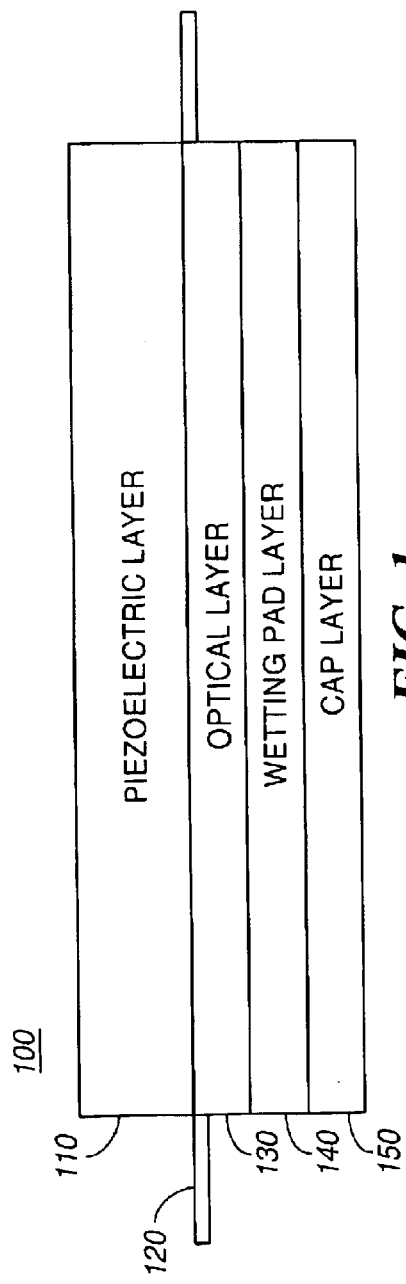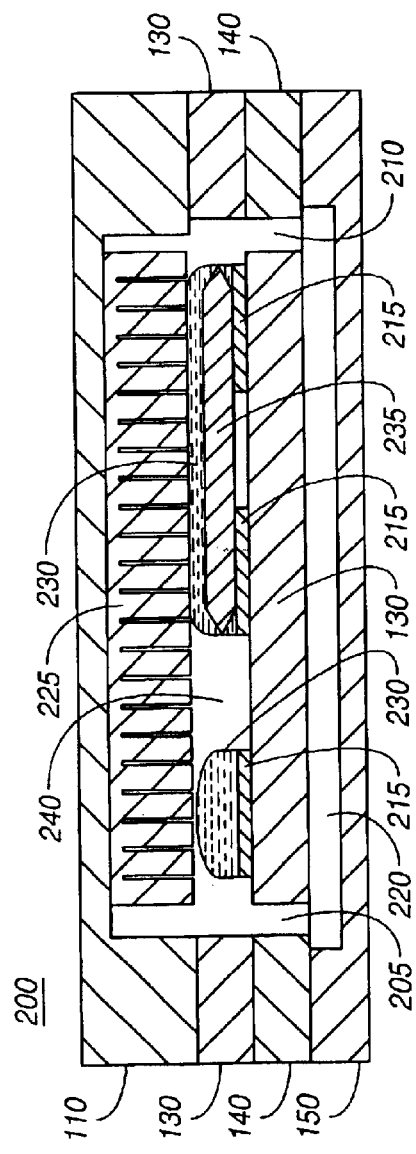

METHOD AND STRUCTURE FOR A SOLID SLUG CATERPILLAR PIEZOELECTRIC OPTICAL RELAY

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Refay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, tilled "Electrically Isolated Liquid Metal MicroSwitches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

TECHNICAL FIELD

This invention relates generally to the field of electronic devices and systems, and more specifically to optical switching technology.

BACKGROUND

A relay or switch may be used to change an optical signal from a first state to a second state. In general there may be more than two states. In applications that require a small switch geometry or a large number of switches within a small region, microelectronic fabrication techniques may be used to create switches with a small footprint. A microelectronic switch may be used in a variety of applications, such as industrial equipment, telecommunications equipment and control of electromechanical devices such as ink jet printers.

In switching applications, the use of piezoelectric technology may be used to actuate a switch. Piezoelectric materials have several unique characteristics. A piezoelectric material can be made to expand or contract in response to an applied voltage. This is known as the indirect piezoelectric effect. The amount of expansion or contraction, the force generated by the expansion or contraction, and the amount of time between successive contractions are important factors that influence the selection of a piezoelectric material in a particular application. Piezoelectric material also exhibits a direct piezoelectric effect, in which an electric field is generated in response to an applied force. This electric field may be converted to a voltage if contacts are properly coupled to the piezoelectric material. The indirect piezoelectric effect is useful in making or breaking a contact within a switching element, while the direct piezoelectric effect is useful in generating a switching signal in response to an applied force.

SUMMARY

A method and structure for an optical switch is disclosed. According to a structure of the present invention, a gas-filled chamber is housed within a solid material. The solid material may be composed of glass, ceramic, metals and adhesive material. A plurality of contacts within the gas-filled chamber are coupled to the solid material, while a plurality of piezoelectric elements within the gas-filled chamber are also coupled to the solid material. A slug within the gas-filled chamber is coupled to one or more of the plurality of contacts and further coupled to one or more of the plurality of piezoelectric elements. The slug is operable to move within the chamber and make or break connections with one or more of the plurality of contacts. A liquid metal within the gas-filled chamber is coupled to the slug, and coupled to the plurality of contacts. The liquid metal acts as a friction-reducing lubricant for motion of the slug, and also is operable to provide a surface tension that maintains a connection between the slug and a contact of the plurality of contacts. According to a method of the present invention, one or more of the plurality of piezoelectric elements are actuated, with the actuation of the one or more piezoelectric elements causing the slug coupled to the one or more piezoelectric elements to move from a first number of contacts to a second number of contacts. The first number of contacts and the second number of contacts are wetted by the liquid metal. The movement of the slug from the first number of contacts to the second number of contacts breaks a liquid metal surface tension between the slug and the first number of contacts and establishes a coupling between the slug and the second number of contacts, thereby enabling the liquid metal switch to change from a first state to a second state. The surface tension of the liquid metal between the slug and the second number of contacts is then operable to maintain a coupling between the second number of contacts and the slug.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is a side view of a liquid metal optical switch, according to certain embodiments of the present invention.

FIG. 2 is a cross section of a liquid metal optical switch, according to certain embodiments of the present invention.

DETAILED DESCRIPTION

Figure 3:
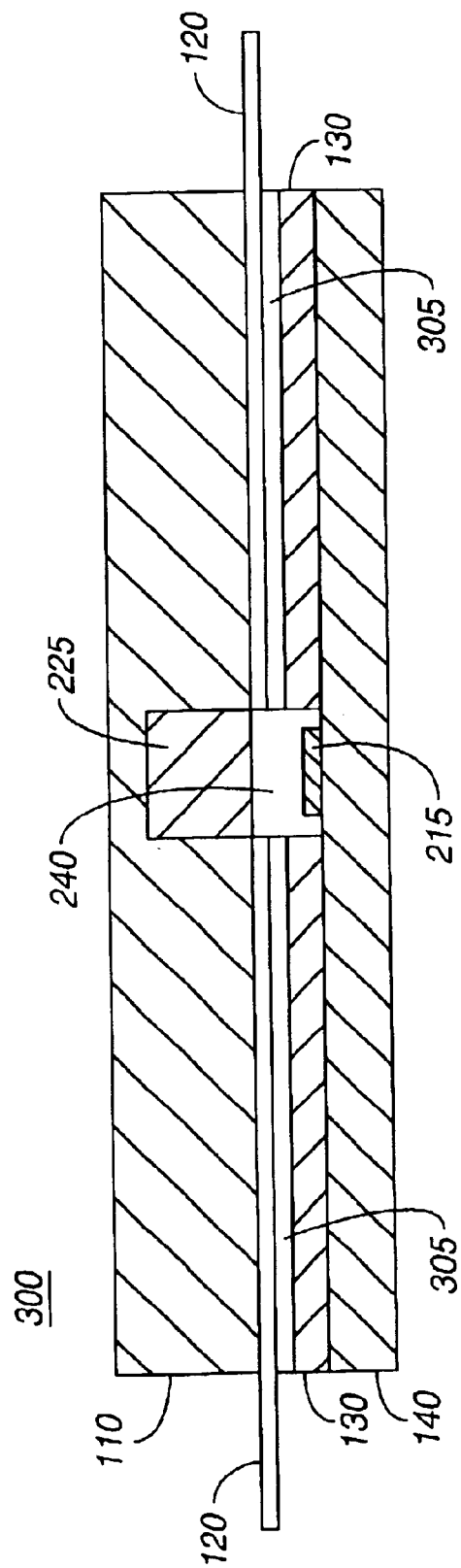
FIG. 3 is a second side view of a liquid metal optical switch, according to certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

A liquid metal optical switch may be represented using a plurality of layers, wherein the plurality of layers represent layers created during a fabrication of the liquid metal optical switch. Referring now to FIG. 1, a side view of a liquid metal optical switch 100 is shown, according to a certain embodiment of the present invention. Piezoelectric layer 110 is coupled to optical waveguide 120, wherein optical waveguide 120 is further coupled to optical layer 130. Optical layer 130 is coupled to wetting pad substrate 140, and wetting pad substrate 140 is coupled to cap layer 150. It is noted that circuit substrate layer 130 may further comprise a plurality of circuit traces, wherein the plurality of circuit traces are not shown in FIG. 1. It is further noted that additional layers may be coupled to cap layer 110, piezoelectric layer 120 and circuit substrate layer 130 without departing from the spirit and scope of the present invention. In certain embodiments of the present invention, piezoelectric layer 110 may be coupled to optical layer 130 and optical waveguide 120. In certain embodiments of the present invention, the piezoelectric layer 110, optical layer 130, wetting pad substrate layer 140, and cap layer 150 may be composed of one or more of glass, ceramic, composite material and ceramic-coated material.

Referring now to FIG. 2, a cross section 200 of liquid metal optical switch 100 is shown, according to a certain embodiment of the present invention. Optical waveguide 120 is oriented perpendicular to the cross-section 200. Piezoelectric layer 110 is coupled to a plurality of piezoelectric elements 225. A chamber 240 resides within optical layer 130, and said chamber 240 is coupled to plurality of piezoelectric elements 225 and further coupled to wetting pad substrate layer 130. Chamber 240 further comprises a plurality of contacts 215, wherein said plurality of contacts are couple to wetting pad substrate layer 130. Liquid metal 230 resides within chamber 240 and is coupled to plurality of contacts 215. Chamber 240 further comprises slug 235, wherein slug 235 is coupled to one or more of the plurality of contacts 215. The liquid metal 230, such as mercury or a Gallium alloy, acts as a friction-reducing lubricant. Slug 235 may be solid or hollow, and may be composed of a wettable material, such as metallic compounds, ceramic or plastic. It is further noted that in certain embodiments of the present invention, slug 235 may be coupled with one or more of the plurality of contacts 215 at all times. In certain embodiments of the present invention slug 235 is surrounded by liquid metal 230.

Chamber 240 is filled with a gas, which in a certain embodiment of the present invention is inert. In a certain embodiment of the present invention, the gas is nitrogen. Slug 235 is represented in FIG. 2 as a solid material, although it is noted that slug 235 may be hollow without departing from the spirit and scope of the present invention. In a certain embodiment of the present invention, slug 235 is tapered at both longitudinal ends of said slug 235 so that slug 235 may be actuated by a movement of a piezoelectric element of the plurality of piezoelectric elements 225. The piezoelectric element may be composed from ceramic, quartz, plastic, or specially designed materials. It is also noted that although liquid metal optical switch 100 is shown with three contacts 215, a greater number of metal contacts may be used without departing from the spirit and scope of the present invention. The plurality of contacts 215 are chosen from a material so that plurality of contacts 215 is wetted by but does not otherwise interact with liquid metal 230. It is noted that in a certain embodiment of the present invention, one or more of plurality of contacts 215 are coupled to slug 235 at each time instant thereby enabling liquid metal switch 100 to switch one or more optical signals in a differential manner.

As shown in FIG. 2, wetting pad substrate layer 140 comprises one or more vias (205, 210) coupled to chamber 240. The one or more vias (205, 210) are further coupled to channel 220, wherein channel 220 is coupled to cap layer 150. In certain embodiments of the present invention, channel 220 resides within cap layer 150. Although two vias (205, 210) are shown in FIG. 2, more than two vias could be used without departing from the spirit and scope of the present invention.

Referring now to FIG. 3 a second side view 300 of liquid metal optical switch 100 is shown, according to certain embodiments of the present invention. The second side view illustrates an orientation of optical waveguide 120 relative to plurality of piezoelectric elements 225, chamber 240 and plurality of contacts 215. Optical waveguide 120 is coupled to chamber 240, and one or more optical signals carried by optical waveguide 120 may be blocked or unblocked by an action of slug 235. Encapsulant 305 is coupled to optical waveguide 120 and further coupled to optical layer 130. In certain embodiments of the present invention, encapsulant 305 is operable to provide stability for optical waveguide 120. In certain embodiments of the present invention, the encapsulant 305 is composed of a dual cure acrylic or epoxy adhesive that can be cured by UV and/or heat.

Figure 4:
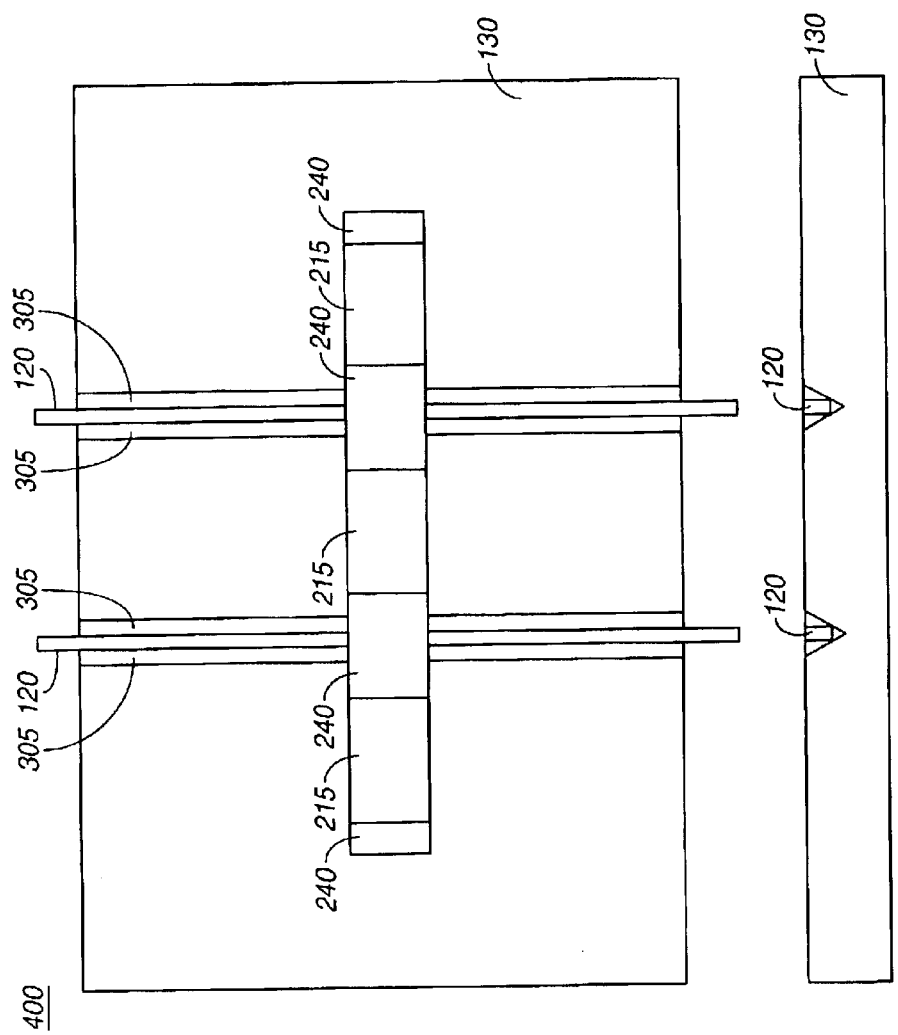
FIG. 4 is a top view of a liquid metal optical switch, according to certain embodiments of the present invention.

Referring now to FIG. 4 a top view of liquid metal optical switch 100 is shown, according to certain embodiments of the present invention. Cap layer 150 and wetting pad substrate layer 140 are not shown for clarity. Slug 235 is also not shown. FIG. 4 clearly illustrates how a motion of slug 235 is operable to block or unblock optical waveguides 120. Although only two optical waveguides and three contacts are illustrated in FIG. 4, it is noted that a greater or fewer number of optical waveguides and a greater or fewer number of contacts could be present in liquid metal optical switch 105 without departing from the spirit and scope of the present invention.

Figure 5:
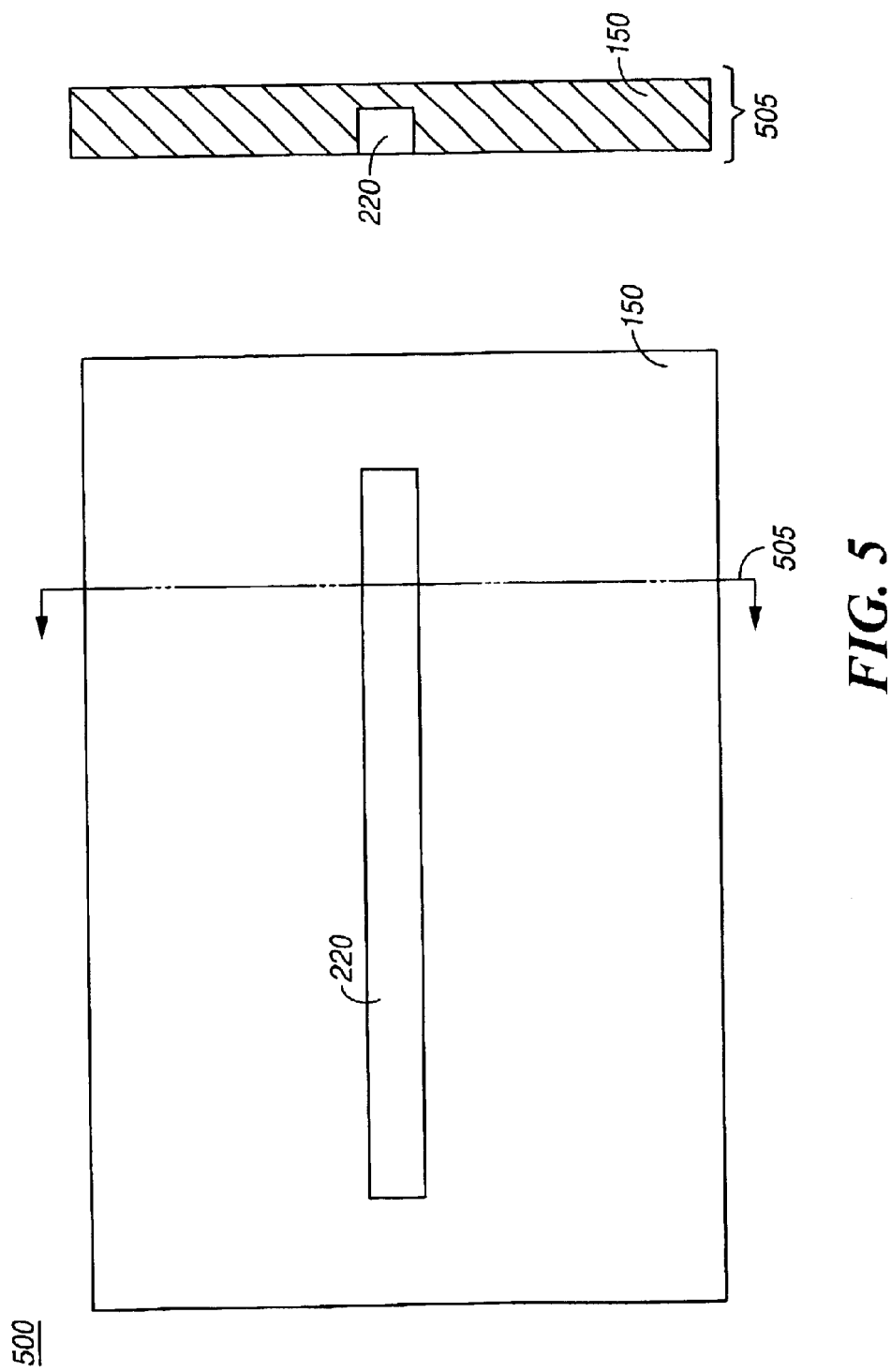
FIG. 5 is a top view of a cap layer of a liquid metal optical switch, according to certain embodiments of the present invention.

Referring now to FIG. 5 a top view of cap layer 150 of liquid metal optical switch 100 is shown, according to certain embodiments of the present invention. Sectional view 505 is also shown to illustrate an extent of channel 220 coupling to cap layer 240. Channel 220 is operable to equalize a pressure of chamber 240, wherein said pressure change is caused by a motion of slug 235. As slug 235 moves, vias 205 and 210 allow a substantially equivalent pressure on a left side of slug 235 and a right side of slug 235.

Figure 6:
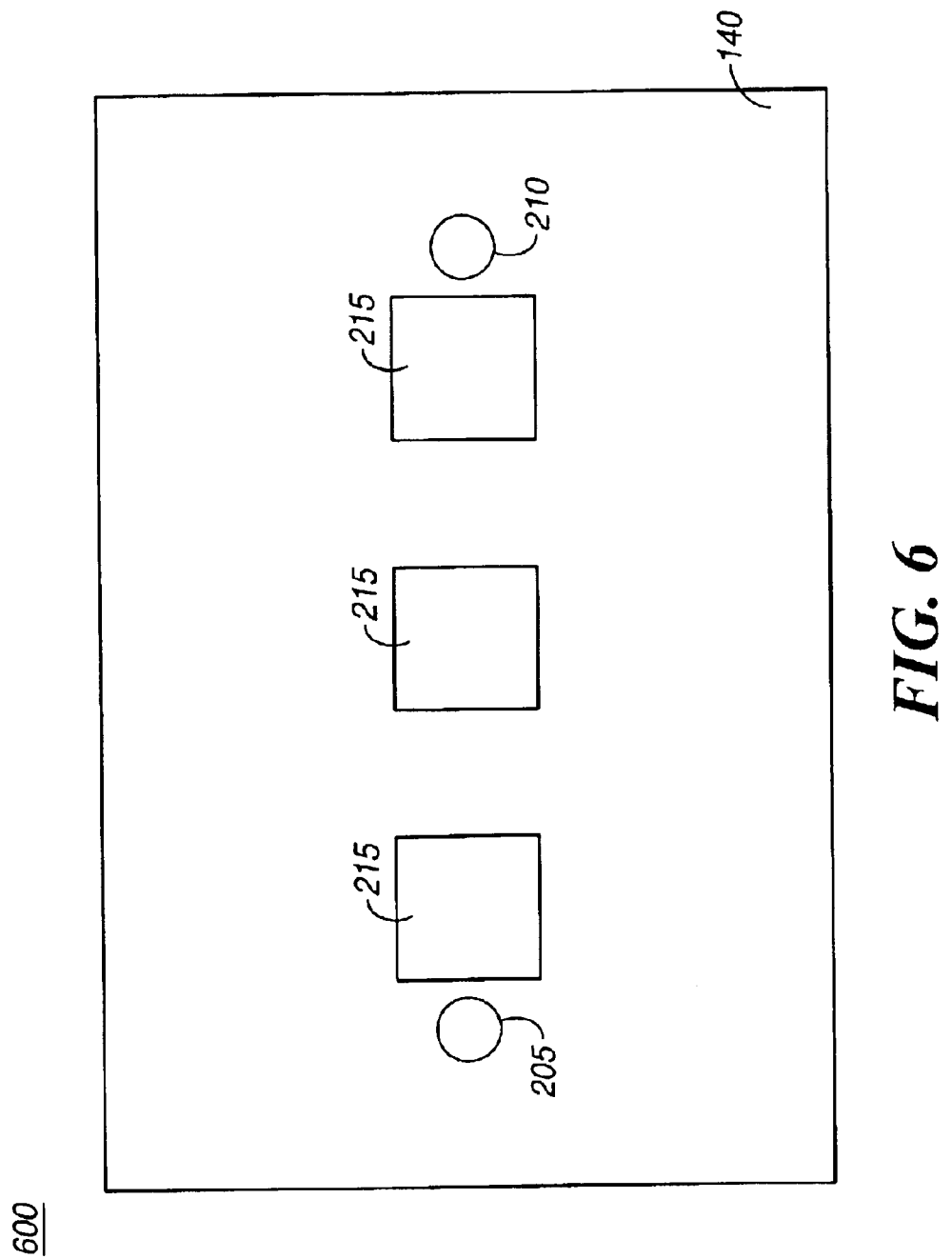
FIG. 6 is a top view of a substrate layer of a liquid metal optical switch, according to certain embodiments of the present invention.

Referring now to FIG. 6 a top view of substrate layer 140 of liquid metal optical switch 100 is shown, according to certain embodiments of the present invention. FIG. 6 illustrates an orientation of vias 205 and 210 relative to plurality of contacts 215. It is noted that although vias 205 and 210 have a circular cross-section and plurality of contacts 215 have a square cross-section, other geometric cross-sections could be used without departing from the spirit and scope of the present invention.

Figure 7:
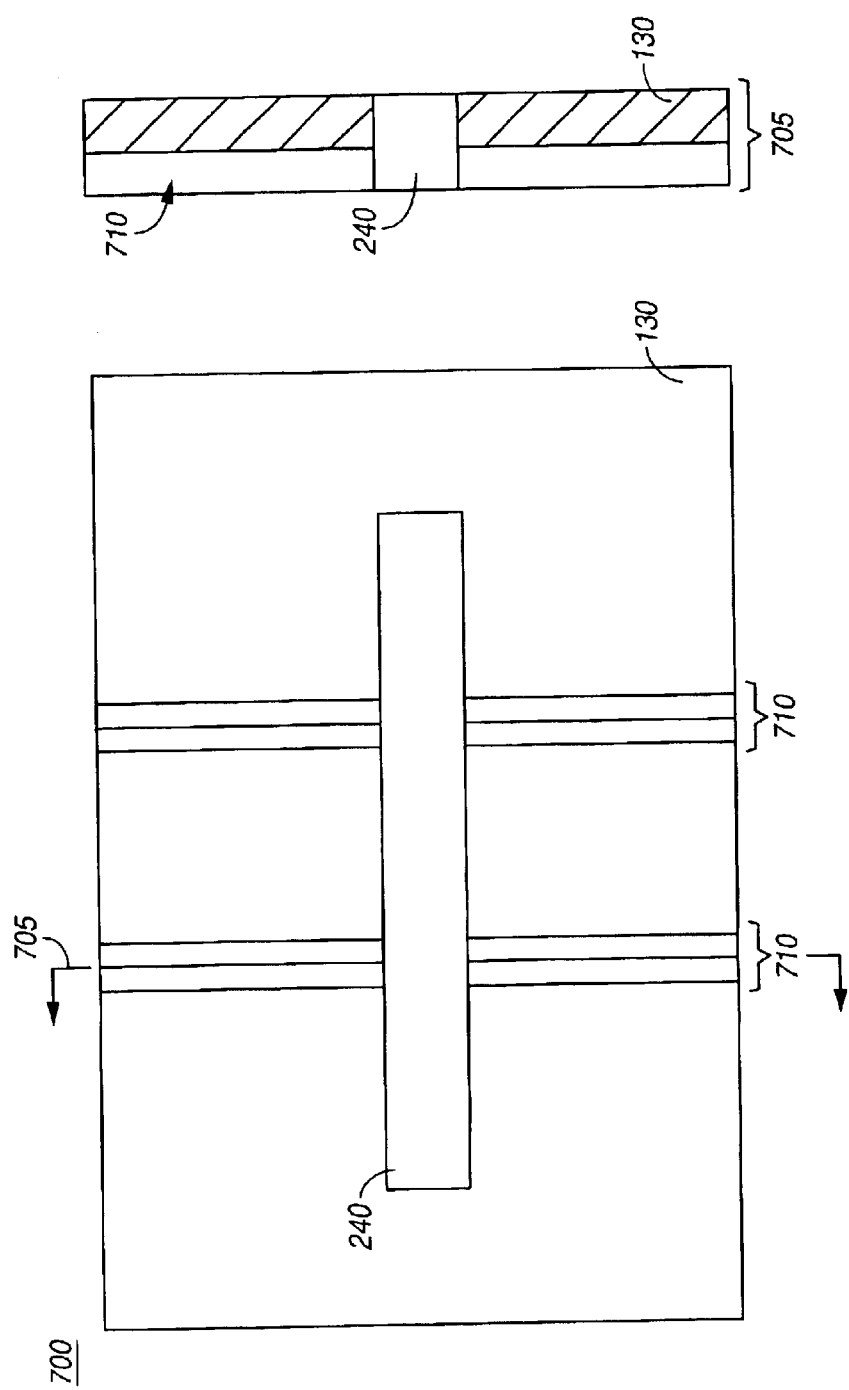
FIG. 7 is a top view of an optical layer of a liquid metal optical switch, according to certain embodiments of the present invention.

Referring now to FIG. 7 a top view of optical layer 130 of liquid metal optical switch 100 is shown, according to certain embodiments of the present invention. FIG. 7 illustrates a top view of optical waveguide holders 710 and a side view 705 of optical waveguide holders 710. It is noted that in certain embodiments of the present invention, optical waveguide holders 710 are contained within optical layer 130.

Figure 8:
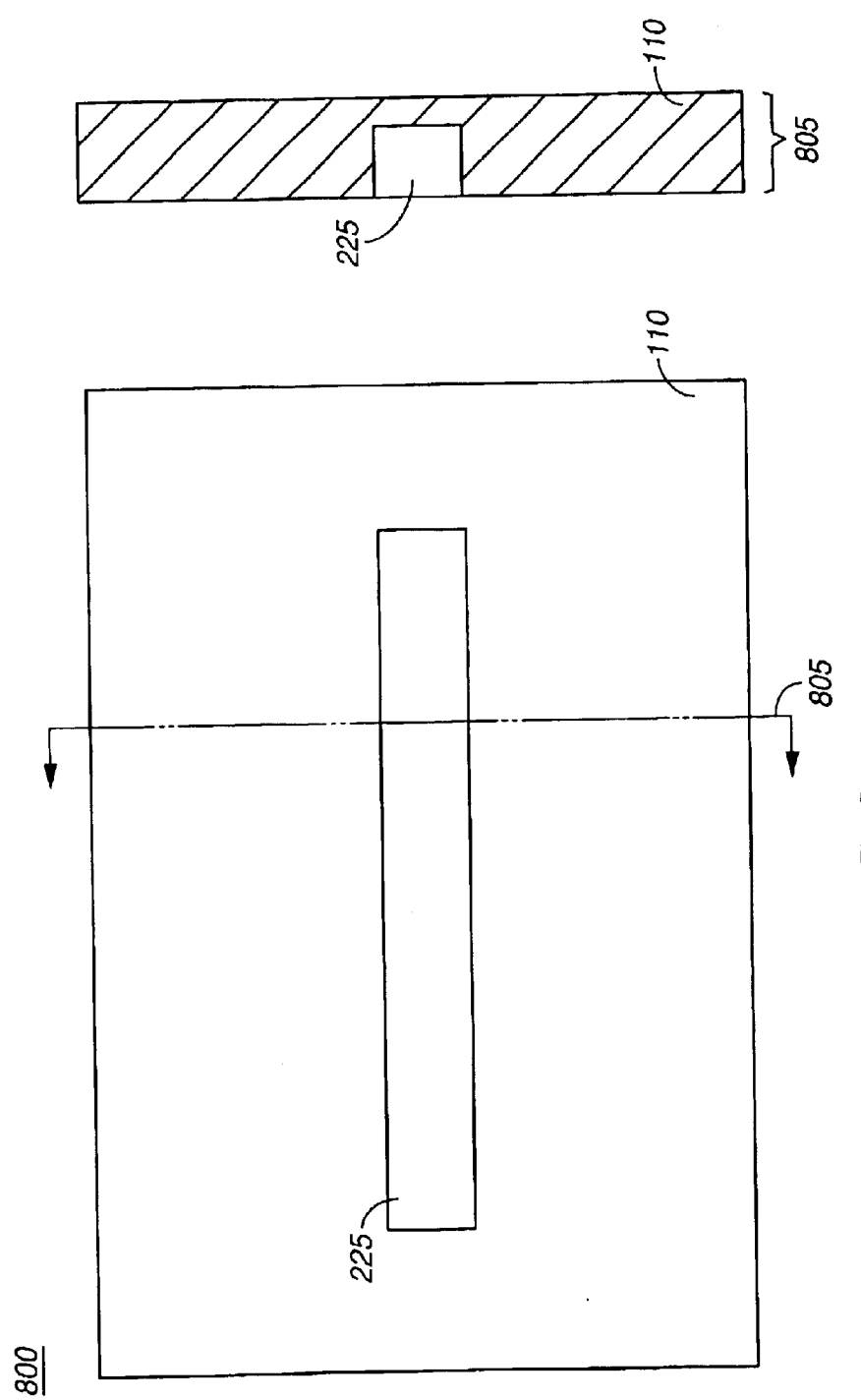
FIG. 8 is a top view of a piezoelectric layer of a liquid metal optical switch, according to certain embodiments of the present invention.

Referring now to FIG. 8 a top view of piezoelectric layer 110 of liquid metal optical switch 100 is shown, according to certain embodiments of the present invention. FIG. 8 illustrates a top view of plurality of piezoelectric elements 225 and a side view 805 of plurality of piezoelectric elements 225. In certain embodiments of the present invention, plurality of piezoelectric elements 225 reside entirely within piezoelectric layer 110 when plurality of piezoelectric elements 225 are not actuated.

The liquid metal switch 100 operates by means of the lateral displacement of one or more of the plurality of piezoelectric elements 225 in an extension mode thereby displacing slug 235 that is wetted by a liquid metal 230 and causing the liquid metal 230 to wet between a first contact of the plurality of contacts 215 and a second contact of the plurality of contacts 215 to close an optical waveguide 120 of liquid metal switch 100.

The lateral motions of the one or more piezoelectric elements squeeze the slug 235 tapered ends, thereby moving the slug 235 along a length of the chamber 240 to overcome surface tension forces that would hold the slug 235 in contact with the first contact. The liquid metal switch 100 latches by means of a surface tension due to liquid metal 230 and the slug 235 wetting to the plurality of contacts 215. The slug 235 is wettable and so may be maintained in a stable position due to the surface tension of the liquid metal 230 and the coupling of the slug 235 to one or more of the plurality of contacts 215. In certain embodiments of the present invention, the plurality of optical waveguides 120 have faces that are not wettable by the liquid metal 230 in order to preserve an optical clarity of a signal path of the plurality of optical waveguides 120.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A structure for an optical switch, comprising:
   a gas-filled chamber housed within a solid material;
   one or more optical waveguides coupled to the gas-filled chamber,
   a plurality of piezoelectric elements within the gas-filled chamber, coupled to the solid material;
   a slug within the gas-filled chamber coupled lo one or more of a plurality of contacts and further coupled to one or more of the plurality of piezoelectric elements, said slug operable to block or unblock one or more optical waveguides; and
   a liquid metal coupled to the slug, and coupled to the plurality of contacts.

2. The structure of claim 1, wherein the plurality of piezoelectric elements are perpendicular to the plurality of contacts.

3. The structure of claim 1, wherein the slug is tapered at one or more ends.

4. The structure of claim 1, wherein the plurality of piezoelectric elements are segmented.

5. The structure of claim 1, wherein the plurality of piezoelectric elements are coupled to a common ground.

6. The structure of claim 1, further comprising a vent passage coupled to the gas-filled chamber, wherein the vent passage comprises one or more vent couplings to the gas-filled chamber.

7. The structure of claim 6, wherein the one or more vent couplings are oriented so that the plurality of piezoelectric elements are located between a first vent coupling of the one or more vent couplings and a second vent coupling of the one or more vent couplings.

8. The structure of claim 1, wherein the chamber is filled with an inert gas.

9. The structure of claim 8, wherein the gas is nitrogen.

10. The structure of claim 1, wherein the chamber further comprises one or more channels.

11. The structure of claim 10, wherein the one or more channels have the same orientation as the chamber.

12. The structure of claim 10, wherein one or more of the one or more channels are located adjacent to the one or more locations where the vent passage is coupled to the chamber.

13. The structure of claim 10, wherein one or more of the one or more channels are located at one or more ends of the plurality of piezoelectric elements.

14. The structure of claim 1, wherein the liquid metal is mercury.

15. The structure of claim 1, wherein the slug stays within a volume of the liquid metal during the actuation of one or more of the plurality of piezoelectric elements.

16. A structure for an optical switch using a plurality of piezoelectric elements, comprising:
   a cap layer;
   a piezoelectric layer coupled to the cap layer;
   one or more optical waveguides coupled to the piezoelectric layer;
   a circuit substrate layer coupled to the piezoelectric layer; and
   a gas-filled chamber coupled to one or more of the piezoelectric layer, one or more optical waveguides, cap layer and circuit substrate layer, wherein the gas-filled chamber further comprises the plurality of piezoelectric elements, a plurality of contacts, a slug coupled to one or more of the plurality of contacts and coupled to one or more of the plurality of piezoelectric elements, and a liquid metal coupled to the slug, and coupled to the plurality of contacts.

17. The structure of claim 16, wherein the cap layer, circuit substrate layer, piezoelectric layer may be composed of one or more of glass, ceramic, composite material and ceramic-coated material.

18. The structure of claim 16, further comprising a vent passage coupled to the gas-filled chamber, wherein the vent passage comprises one or more vent couplings to the gas-filled chamber.

19. The structure of claim 18, wherein the one or more vent couplings are oriented so that the plurality of piezoelectric elements are located between a first vent coupling of the one or more vent couplings and a second vent coupling of the one or more vent couplings.

20. The structure of claim 16, wherein the circuit substrate layer further comprises a plurality of circuit traces and a plurality of pads operable to route one or more signals generated by actuation of one or more of the plurality of piezoelectric elements.

21. The structure of claim 16, wherein the chamber is filled with an inert gas.

22. The structure of claim 16, wherein the chamber further comprises one or more channels.

23. The structure of claim 22, wherein one or more of the one or more channels are located at one or more ends of the plurality of piezoelectric elements.

24. The structure of claim 16, wherein the one or more optical waveguides are further coupled to an encapsulant layer, said encapsulant layer coupled to the piezoelectric layer.

25. The structure of claim 24, wherein the encapsulant layer is composed of a dual cure acrylic or epoxy adhesive that can be cured by UV and/or heat.

26. A method for optical switching of one or more optical signals using a liquid metal switch, comprising:

actuating one or more of a plurality of piezoelectric elements;

the actuation of the one or more piezoelectric elements causing a slug coupled to the one or more piezoelectric elements to move from a first number of contacts to a second number of contacts wherein the first number of contacts and the second number of contacts are wetted by a liquid metal; and the movement of the slug from the first number of contacts to the second number of contacts breaking a liquid metal surface tension between the slug and the first number of contacts and establishing a coupling between the slug and the second number of contacts, thereby enabling the liquid metal switch to change from a first state to a second state by the blocking or unblocking of one or more optical waveguides.

27. The method of claim 26, wherein the slug is wetted by the liquid metal.

28. The method of claim 26, wherein the coupling between the slug and the second number of contacts is due to a plurality of surface tension forces caused by the liquid metal.

29. The method of claim 26, wherein the one or more piezoelectric elements have substantially equivalent actuation properties.

30. The method of claim 26, wherein one or more of the first number of contacts and one or more of the second number of contacts are the same.

31. The method of claim 26, wherein the liquid metal is separable into one or more volumes within the chamber.

32. The method of claim 26, wherein one or more of the one or more volumes of liquid metal are coupled to the one or more contacts.

33. The method of claim 26, wherein actuating one or more of the plurality of piezoelectric elements is operable to reduce a velocity of the slug.

34. The method of claim 26, wherein the one or more piezoelectric elements are located at an end of the chamber.

35. The method of claim 26, wherein the plurality of piezoelectric elements are actuated in an adjacent manner.

* * * * *

UNITED STATES PATENT AND TRADEMARK OFFICE
CERTIFICATE OF CORRECTION

PATENT NO.      : 6,816,641 B2
DATED           : November 9, 2004
INVENTOR(S)     : Marvin Glenn Wong and Arthur Fong It is certified that error appears in the above-identified patent and that said Letters Patent is hereby corrected as shown below:

Column 1,
Line 54, after "Optical Latching", delete "Refay" and insert therefor -- Relay --

Column 2,
Line 58, after "10020071-1", delete "tilled" and insert therefor -- titled --

Column 7,
Line 58, after "coupled", delete "lo" and insert therefore -- to --

Signed and Sealed this

Tenth Day of May, 2005

JON W. DUDAS
*Director of the United States Patent and Trademark Office*